United States Patent
Qiu et al.

(10) Patent No.: US 7,489,121 B2
(45) Date of Patent: Feb. 10, 2009

(54) COMPENSATION OFFSET ADJUSTMENT SCHEME FOR FAST REFERENCE VOLTAGE TRANSITIONING

(75) Inventors: Weihong Qiu, San Jose, CA (US);
Robert H. Isham, Flemington, NJ (US);
Zhixiang Liang, Portland, OR (US)

(73) Assignee: Intersil Americas Inc., Milpitas, CA (US)

( * ) Notice: Subject to any disclaimer, the term of this patent is extended or adjusted under 35 U.S.C. 154(b) by 312 days.

(21) Appl. No.: 11/395,909

(22) Filed: Mar. 31, 2006

(65) Prior Publication Data

US 2007/0108954 A1 May 17, 2007

Related U.S. Application Data (60) Provisional application No. 60/737,524, filed on Nov. 16, 2005.

(51) Int. Cl.
*G05F 1/40* (2006.01)
(52) U.S. Cl. .................. 323/288; 323/222; 323/284
(58) Field of Classification Search .............. 323/222, 323/282, 284, 288, 901
See application file for complete search history.

(56) References Cited

U.S. PATENT DOCUMENTS

| | | | | |
|---|---|---|---|---|
| 5,689,176 | A | * | 11/1997 | Deloy ........................ 323/222 |
| 6,522,115 | B1 | * | 2/2003 | Greitschus .................. 323/288 |
| 7,038,514 | B2 | * | 5/2006 | Leith et al. .................. 323/901 |
| 7,135,841 | B1 | * | 11/2006 | Tomiyoshi et al. .......... 323/224 |
| 2007/0013356 | A1 | * | 1/2007 | Qiu et al. .................... 323/288 |

* cited by examiner

*Primary Examiner*—Jessica Han
(74) *Attorney, Agent, or Firm*—Gary R. Stanford (57) ABSTRACT

A PWM control circuit for a voltage regulator including a compensation network, a ramp generator providing a ramp voltage, an offset adjust circuit and a comparator circuit. The compensation network senses the output voltage, receives a reference voltage, and outputs a compensation voltage. The offset adjust circuit adjusts a selected one of the ramp voltage and the compensation voltage based on the reference voltage. The comparator circuit compares the compensation voltage with the ramp voltage and provides a PWM signal for controlling the output voltage. The offset adjust circuit may generate an offset voltage based on the reference voltage and a gain G of the voltage regulator. The offset adjust circuit may subtract the offset voltage from either the ramp voltage or the compensation voltage to provide an adjusted voltage to the comparator circuit.

20 Claims, 5 Drawing Sheets

COMPENSATION OFFSET ADJUSTMENT SCHEME FOR FAST REFERENCE VOLTAGE TRANSITIONING

CROSS-REFERENCE TO RELATED APPLICATIONS

This application claims the benefit of U.S. Provisional Application No. 60/737,524 filed on Nov. 16, 2005, which is herein incorporated by reference for all intents and purposes.

BACKGROUND OF THE INVENTION

1. Field of the Invention

The present invention relates to power regulators, and more particularly to a compensation offset adjustment scheme for fast reference voltage transitioning to improve the settle-down performance in response to transitions of the reference voltage.

2. Description of the Related Art

The output voltage of a power supply (e.g., voltage regulator) is adjusted to achieve better performance under certain operational conditions in some applications. For example, the desired voltage for a central processing unit (CPU) may be a first voltage V1 under normal operating conditions and a second, lower voltage V2 under a sleep-mode condition. The typical way to change the output voltage is to adjust the reference voltage of the voltage regulator. The transition from V1 to V2 may occur very quickly and the voltage regulator should be able to operate with stability under this transition period and settle down in a relatively short time after the voltage transition. A typical compensation network of the voltage regulator is optimized to achieve good transient response to changes at the output. The compensation parameters are not optimal, however, for dynamic reference voltage transitions. The system settle-down performance after any reference voltage changes depends on the lowest zero frequency of the compensation network, while the zero frequency position is defined based on the system transient and stability requirements. When the reference voltage transitions from one voltage to another, the error amplifier changes from one operational point to another point in order to move the output voltage to follow the new reference voltage. The compensation network settles down slowly to the new operational point, however, due to a low frequency zero. The slow settle-down event of the compensation network causes a relatively large difference between the reference voltage and the output voltage for a significant period of time.

It is desired to provide compensation offset adjustment that achieves fast reference voltage transitioning to improve settle-down performance in response to transitions of the reference voltage of a DC-DC voltage regulator.

SUMMARY OF THE PRESENT INVENTION

A PWM control circuit for a voltage regulator according to an embodiment of the present invention includes a compensation network, a ramp generator, an offset adjust circuit and a comparator circuit. The compensation network has a first input sensing an output voltage, a second input receiving a reference voltage, and an output providing a compensation voltage. The ramp generator provides a ramp voltage. The offset adjust circuit adjusts a selected one of the ramp voltage and the compensation voltage based on the reference voltage. The comparator circuit compares the compensation voltage with the ramp voltage and provides a PWM signal for controlling the output voltage.

The offset adjust circuit may generate an offset voltage based on the reference voltage and a gain G of the voltage regulator. In one embodiment, the offset adjust circuit multiplies the reference voltage by $1-1/G$ to generate the offset voltage. The offset adjust circuit may subtract the offset voltage from the compensation voltage to provide an adjusted compensation voltage to the comparator circuit. Alternatively, the offset adjust circuit may subtract the offset voltage from the ramp voltage to provide an adjusted ramp voltage to the comparator circuit.

The compensation network may include an error amplifier having first and second inputs and an output, in which the first input receives the reference voltage. The compensation network may further include a capacitor coupled between the second input and the output of the error amplifier. In this embodiment, the offset adjust circuit is configured to minimize the voltage change across the capacitor in response to a voltage change of the reference voltage.

In an alternative embodiment, the offset adjust circuit controls the ramp generator to adjust a slew rate of the ramp signal in response to a change of the reference voltage. In a more specific embodiment, the ramp generator and the offset adjust circuit collectively include a voltage-controlled current source, a capacitor, and a switch circuit. The voltage-controlled current source is coupled between ground and a node developing the ramp voltage and provides a current as a function of a reference voltage to the node. The capacitor is coupled between ground and the node to receive the current from the voltage-controlled current source. The switch circuit is coupled between ground and the node and enables the voltage-controlled current source to charge the capacitor between minimum and maximum voltage levels at a rate based on a clock signal.

A DC-DC voltage converter according to an embodiment of the present invention includes a gate drive circuit, first and second switches, an output inductor and a PWM control circuit. The gate drive circuit receives a PWM signal and provides first and second gate drive signals. The first and second switches have current terminals coupled in series between an input voltage and ground forming a phase node and each has a control terminal receiving a corresponding one of the first and second gate drive signals. The output inductor has a first end coupled to the phase node and a second end providing an output voltage. The PWM control circuit includes a compensation network, a ramp generator, an offset adjust circuit and a comparator circuit. The compensation network has a first input sensing the output voltage, a second input receiving a reference voltage, and an output providing a compensation voltage. The ramp generator provides a ramp voltage. The offset adjust circuit adjusts a selected one of the ramp voltage and the compensation voltage based on the reference voltage. The comparator circuit compares the compensation voltage with the ramp voltage and which provides the PWM signal.

A method of compensating for a transition of a reference voltage of a voltage regulator according to an embodiment of the present invention includes generating a compensation voltage based on the reference voltage and an output voltage of the voltage regulator, providing a ramp voltage, adjusting either one of the compensation voltage and the ramp voltage in response to a transition of the reference voltage, and comparing the ramp voltage with the compensation voltage to generate a PWM signal for controlling the output voltage.

The method may include combining an offset voltage that is based on the reference voltage and a gain G of the voltage regulator. The method may include multiplying the reference voltage by $1-1/G$. The method may include subtracting the offset voltage from the compensation voltage to provide an adjusted compensation voltage and comparing the ramp voltage with the adjusted compensation voltage. The method may include subtracting the offset voltage from the ramp voltage to provide an adjusted ramp voltage and comparing the compensation voltage with the adjusted ramp voltage. The method may include minimizing a difference between the compensation voltage and the reference voltage. The method may include adjusting a slew rate of the ramp signal.

BRIEF DESCRIPTION OF THE DRAWINGS

The benefits, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1:
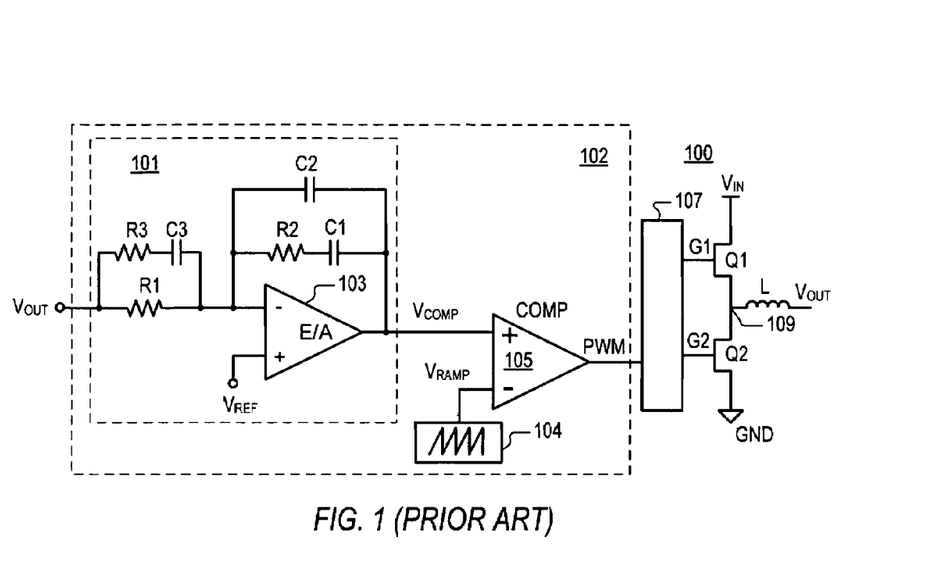
FIG. 1 is a schematic and block diagram of a DC-DC voltage converter including a conventional pulse width modulation control circuit.

FIG. 1 is a schematic and block diagram of a DC-DC voltage converter 100 including a conventional pulse width modulation (PWM) control circuit 102. The DC-DC voltage converter 100 illustrated is a buck-type voltage converter although it is understood that the present invention applies to other types of voltage converters and power converter topologies. The PWM control circuit 102 includes a compensation network 101 coupled to a comparator (COMP) 105. An output signal $V_{OUT}$ of the voltage converter is fed back to an input of the compensation network 101, specifically to one end of resistors R1 and R3. The other end of R1 is coupled to the inverting input of an error amplifier 103, having its non-inverting input receiving a reference voltage $V_{REF}$. The other end of the resistor R3 is coupled to one end of a capacitor C3, having its other end coupled to the inverting input of the error amplifier 103. A capacitor C2 is coupled between the inverting input and the output of the error amplifier 103. A resistor R2 has one end coupled to the inverting input of the error amplifier 103 and another end coupled to one end of a capacitor C1, which has its other end coupled to the output of the error amplifier 103.

The output of the error amplifier 103 provides the output of the compensation network 101, shown as a compensation voltage $V_{COMP}$, to the non-inverting input of the comparator 105. A ramp generator 104 generates and provides a ramp waveform signal $V_{RAMP}$ to the non-inverting input of the comparator 105, which compares $V_{COMP}$ and $V_{RAMP}$ to generate a PWM signal used to control the power cycles of the voltage converter. The PWM signal is provided to the input of a gate driver (GD) 107,having a first output providing a first gate drive signal G1 and a second output providing a second gate drive signal G2. The G1 signal is provided to the gate of a first electronic switch Q1 and the G2 signal is provided to the gate of a second electronic switch Q2. The electronic switches Q1 and Q2 are illustrated as metal-oxide semiconductor, field-effect transistors (MOSFETs) although other types of electronic switches are contemplated. The electronic switches Q1 and Q2 have their drain and sources coupled in series between an input voltage $V_{IN}$ and ground (GND). The junction between the switches Q1 and Q2 is a phase node 109 coupled to one end of an output inductor L, having its other end developing the $V_{OUT}$ signal as understood by those skilled in the art.

The compensation network 101 includes two zeros: R1*C3 and R2*C1 (where the asterisk "*" denotes multiplication). When the input voltage $V_{IN}$, the load current, or the voltage of $V_{REF}$ changes, the compensation network 101 moves from one operational point to another operational point. In particular, the $V_{COMP}$ voltage transitions from one voltage to another. Depending on the zero frequency, the compensation network 101 slowly reaches its final operational point and the output voltage $V_{OUT}$ settles down relatively slowly as well.

Figure 2:
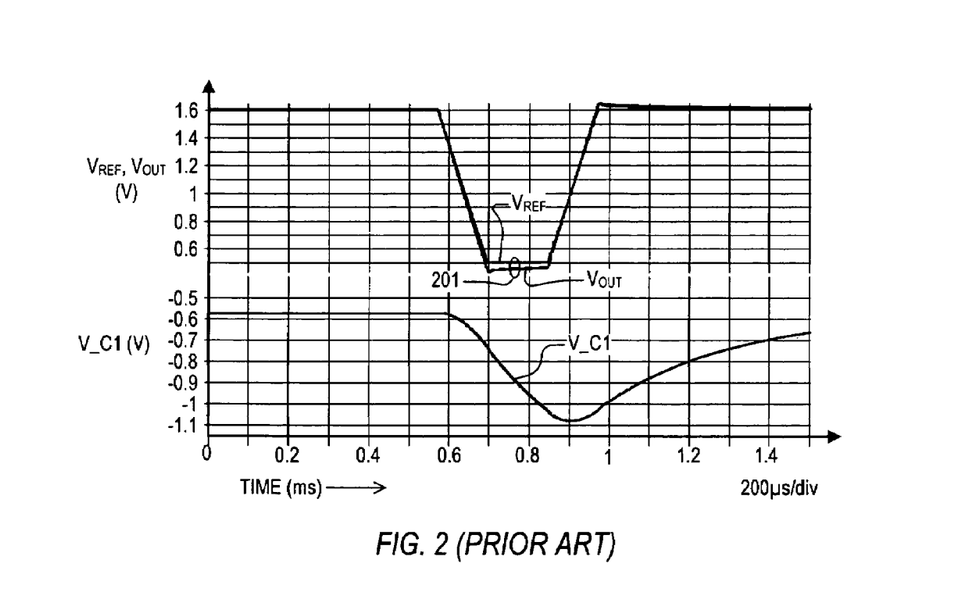
FIG. 2 shows a pair of timing diagrams illustrating a simulation result of the DC-DC voltage converter employing the conventional PWM control circuit of FIG. 1 in which the compensation network of FIG. 1 has a lowest zero frequency equal to 3 kHz.

FIG. 2 shows a pair of timing diagrams illustrating a simulation result of the DC-DC voltage converter 100 employing the conventional PWM control circuit 102 in which the compensation network 101 has a lowest zero frequency equal to 3 kilohertz (kHz). The upper timing diagram plots $V_{REF}$ and $V_{OUT}$ in Volts (V) versus time (TIME) in milliseconds (ms) and the lower timing diagram plots the voltage across the capacitor C1, shown as a voltage V_C1, during the same time period of time. The reference voltage $V_{REF}$ transitions from a first, higher voltage of approximately 1.6V to a second, lower voltage of approximately 0.5V, while the control loop of the voltage converter 100 moves the output voltage $V_{OUT}$ to follow this change from 1.6V to 0.5V. In this example, the output voltage $V_{OUT}$ is intended to have substantially the same voltage as the reference voltage $V_{REF}$. The low frequency zero of the compensation network 101 causes a long settle-down time. The V_C1 voltage illustrates the slow settle-down characteristics. And the peak-to-peak voltage change of V_C1 is about 0.5V when $V_{REF}$ changes from 1.6V to 0.5V. There exists a significant variation between the output voltage $V_{OUT}$ and $V_{REF}$ during the settle-down period as shown at 201.

In a compensation offset voltage adjustment scheme according to an embodiment of the present invention, the same compensation network 101 is used to provide $V_{COMP}$, except that the reference voltage $V_{REF}$ is used to derive an adjusted compensation voltage or an adjusted ramp signal to minimize the voltage change of V_C1 (across the capacitor C1). The $V_{COMP}$ signal is adjusted approximately by the same amount as the VOUT and $V_{REF}$ signals, so that the settle down time of the compensation network 101 in response to transitions of $V_{REF}$ is much shorter than that of the conventional scheme.

For different levels of $V_{REF}$, a different duty cycle of the PWM signal is needed to keep the output voltage $V_{OUT}$ equal to $V_{REF}$. The duty cycle depends on the compensation and ramp voltages. A compensation offset voltage adjustment scheme according to one embodiment of the present invention provides an offset voltage subtracted from $V_{COMP}$ to provide an adjusted compensation signal $V_C$ to achieve the required duty cycle of the PWM signal, so that the $V_{COMP}$ signal is adjusted to keep the voltage across the capacitor C1 relatively constant or otherwise with minimal variation. In another embodiment, the offset voltage is subtracted from $V_{RAMP}$ to provide an adjusted ramp signal $V_R$ to achieve substantially the same result. In yet another embodiment, $V_{REF}$ is used to adjust the slope of $V_{RAMP}$ to achieve substantially the same result.

Figure 3:
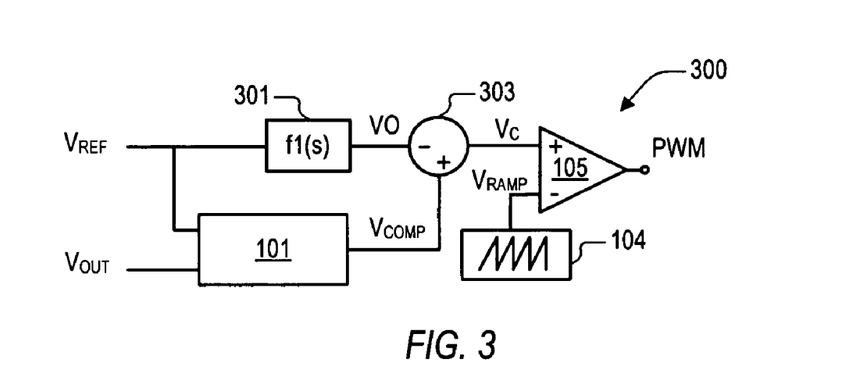
FIG. 3 is a schematic and block diagram of a PWM control circuit implemented according to one exemplary embodiment of the present invention that may be used to replace the PWM control circuit of FIG. 1.

FIG. 3 is a schematic and block diagram of a PWM control circuit 300 implemented according to one exemplary embodiment of the present invention that may be used to replace the PWM control circuit 102. Similar components as those of FIG. 1 assume identical reference numbers. The compensation network 101 is included which receives the $V_{REF}$ and $V_{OUT}$ signals and provides the $V_{COMP}$ signal. The ramp generator 104 is included and provides the $V_{RAMP}$ signal. The reference voltage $V_{REF}$ is provided to the input of an offset adjust circuit 301 having an output providing an offset voltage VO to an inverting input of an adder 303. The offset adjust circuit 301 performs a function $f1(s)$, which is either a simple gain function or a more complex function to further improve the performance. The compensation voltage $V_{COMP}$ is provided to a non-inverting input of the adder 303, which has an output providing an adjusted compensation voltage $V_C$ to the non-inverting input of the comparator 105. In the embodiment illustrated, the adder 303 subtracts VO from $V_{COMP}$ to develop the $V_C$ signal. The $V_{RAMP}$ signal is provided to the inverting input of the comparator 105 as before, and the output of the comparator 105 provides the PWM signal.

In one embodiment, the function $f1(s)$ is based on the gain of the DC-DC regulator 100 employing the PWM control circuit 300. The gain $G_M$ of the DC-DC regulator 100 is based on the voltage of $V_{IN}$ and the peak-to-peak voltage $V_{PP}$ of the $V_{RAMP}$ signal, such as according to the following equation 1:

$$G_M = \frac{V_{IN}}{V_{PP}} \quad (1)$$

And continuing this embodiment, the function $f1(s)$ is a multiplier of $V_{REF}$ according to the following equation 2:

$$f1(s) = 1 - \frac{1}{G_M} \quad (2)$$

And thus the offset voltage VO is determined according to the following equation 3:

$$VO = f1(s) * V_{REF} = V_{REF} - \frac{V_{REF}}{G_M} \quad (3)$$

In a more specific embodiment, the input voltage $V_{IN}$ is approximately 12V and the peak-to-peak voltage $V_{PP}$ of $V_{RAMP}$ is approximately 1.5V so that the modulator gain $G_M$ is approximately 8. In this case, the multiplier $f1(s)$ is 0.875 so that VO=0.875$V_{REF}$.

Figure 4:
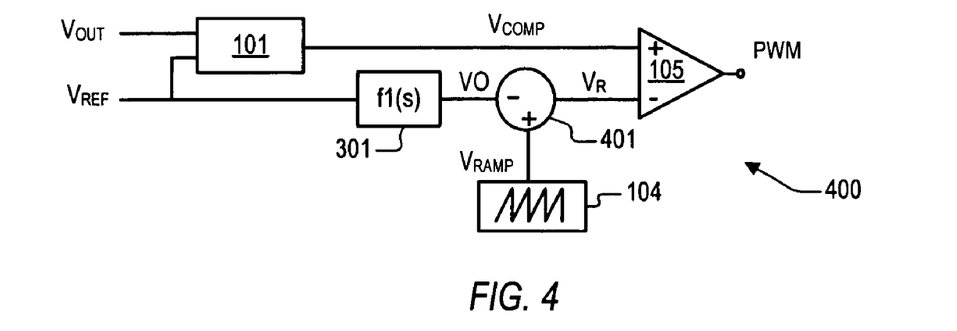
FIG. 4 is a schematic and block diagram of another PWM control circuit implemented according to another exemplary embodiment of the present invention that may be used to replace the PWM control circuit of FIG. 1.

FIG. 4 is a schematic and block diagram of another PWM control circuit 400 implemented according to another exemplary embodiment of the present invention that may be used to replace the PWM control circuit 102. Similar components as those of the circuit 300 assume identical reference numbers for the circuit 400. The compensation network 101 is again included which receives the $V_{REF}$ and $V_{OUT}$ signals and provides the $V_{COMP}$ signal. And the ramp generator 104 provides the $V_{RAMP}$ signal. In this case, $V_{COMP}$ is provided directly to the non-inverting input of the comparator 105. The reference voltage $V_{REF}$ is again provided to the input of the offset adjust circuit 301 for multiplying $V_{REF}$ by $f1(s)$ and providing the offset voltage VO at its output in the same manner as the compensation offset adjustment circuit 300. In this case, however, the offset voltage VO is provided to the inverting input of an adder 401, which receives the $V_{RAMP}$ signal at its non-inverting input. The adder 401 subtracts the offset voltage VO from the ramp voltage $V_{RAMP}$ to provide an adjusted ramp voltage $V_R$, which is provided to the inverting input of the comparator 105. The output of the comparator 105 provides the PWM signal. The end result of the PWM control circuit 400 is substantially the same as the PWM control circuit 300 except that the $V_{RAMP}$ signal is adjusted rather than the compensation signal.

Figure 5:
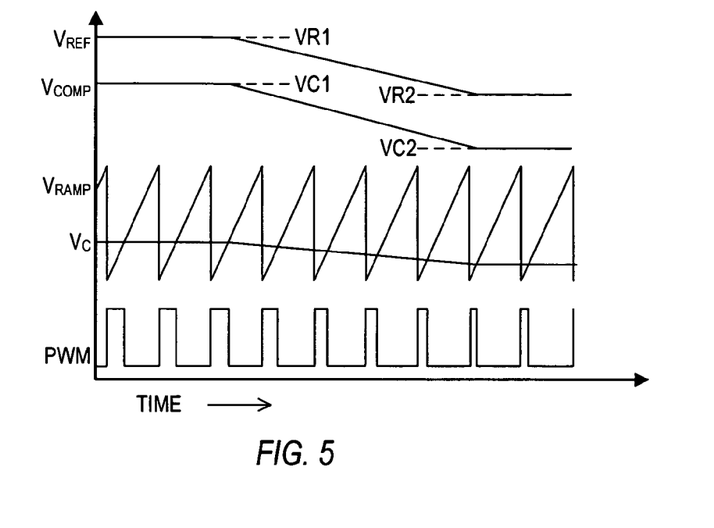
FIG. 5 is a timing diagram illustrating operation of the PWM control circuit of FIG. 3 to adjust the offset of the ramp signal.

FIG. 5 is a timing diagram illustrating operation of the PWM control circuit 300 to adjust the offset of the $V_{RAMP}$ signal. The $V_{REF}$, $V_{COMP}$, $V_C$, $V_{RAMP}$ and PWM signals are plotted versus time. The offset voltage VO is a function of the $V_{REF}$ voltage, and may also be a function of the input voltage for some topologies based on the selected function $f1(s)$. The VREF voltage changes (e.g., decreases as illustrated) from a first voltage level VR1 to a second voltage level VR2. Since the output voltage $V_{OUT}$ generally follows $V_{REF}$, $V_{OUT}$ changes by the same or by a proportional amount as $V_{REF}$. The compensation voltage $V_{COMP}$ changes from a first voltage level VC1 to a second voltage level VC2 in response to the change of $V_{REF}$. With reference to the compensation network 101 shown in FIG. 1, $V_{OUT}$, $V_{REF}$ and $V_{COMP}$ all change by about the same amount, so that the change of the voltage V_C1 across the capacitor C1 is minimized. Since the change of the voltage V_C1 across the capacitor C1 is minimized, the otherwise slow response of the compensation network 101 becomes insignificant and inconsequential. The voltage of $V_C$ changes by the appropriate amount to adjust the duty cycle of the PWM signal to the appropriate level for the corresponding change of $V_{OUT}$. The offset voltage VO may be used instead to adjust $V_{RAMP}$ as illustrated by the PWM control circuit 400 with substantially the same results.

Figure 6:
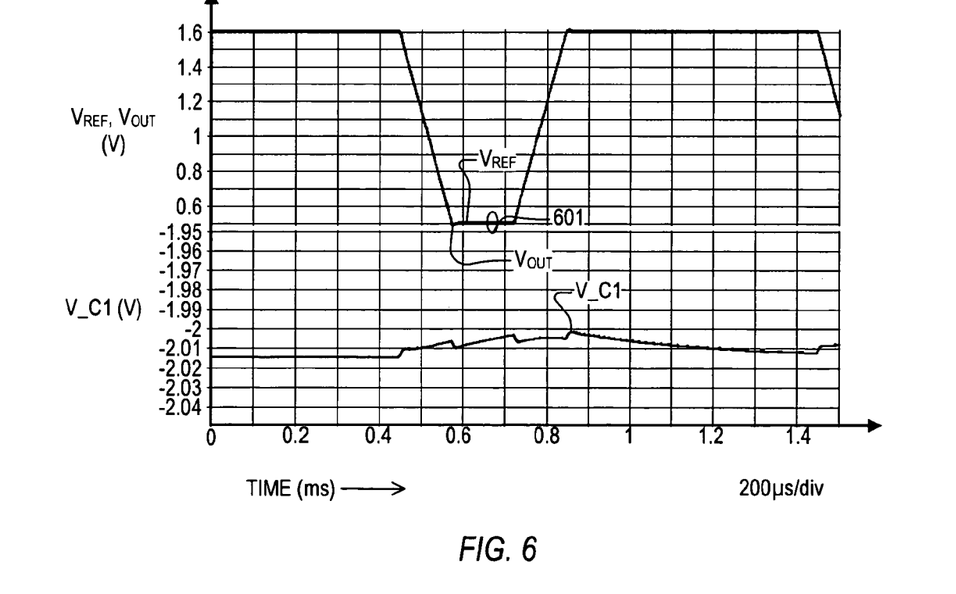
FIG. 6 shows a pair of timing diagrams illustrating a simulation result of a the DC-DC voltage converter of FIG. 1 employing the compensation network and including either one of the PWM control circuits of FIG. 3 or 4 implemented according to an embodiment of the present invention.

FIG. 6 shows a pair of timing diagrams illustrating a simulation result of the DC-DC voltage converter 100 employing the compensation network 101 and including either one of the PWM control circuits 300 or 400 implemented according to an embodiment of the present invention in which the function $f1(s)$ is set to a simple gain function such as according to equation 2. The same compensation network 101 with a lowest zero frequency equal to 3 kHz is used for the simulation. The peak-to-peak voltage change of the voltage V_C1 is less than 15 millivolts (mV) in response to the change of $V_{REF}$ from 1.6V to 0.5V, resulting in very small variation between $V_{REF}$ and $V_{OUT}$. Therefore the $V_{OUT}$ voltage settles down to its final value very quickly after the transition of $V_{REF}$. As shown, $V_{OUT}$ and $V_{REF}$ follow each other very closely with little error as shown at 601 so that the otherwise significant error shown at 201 is minimized or otherwise avoided.

In either of the PWM control circuits 300 or 400 implemented according to embodiments of the present invention, the input voltage $V_{IN}$ is either sensed directly or otherwise calculated or derived. In one embodiment, $V_{IN}$ is provided directly to the controller chip and sensed directly. In another embodiment, the phase node 109 is provided to the controller chip and VIN is determined by sampling the phase node voltage when the upper electronic switch Q1 is turned on. In yet other embodiments, since the duty cycle of the PWM signal is equal to $V_{REF}/V_{IN}$ and is also equal to $V_C/V_{PP}$, then $V_{IN}$ can be derived. For example, for the PWM control circuit 300, $V_{IN}=V_{REF}*(V_{PP}/V_C)$ and for the PWM control circuit 400, $V_{IN}=V_{REF}*(V_{PP}/V_R)$ in which $V_{PP}$ is the peak-to-peak voltage of the operative ramp voltage $V_R$ or $V_{RAMP}$. In these latter embodiments in which $V_{IN}$ is derived from $V_{REF}$, $V_{PP}$ and $V_C$ or $V_R$, a low pass filter and a maximum value limiter (for the ramp signal) are used and measurements are made while VIN is not changing significantly.

Figure 7:
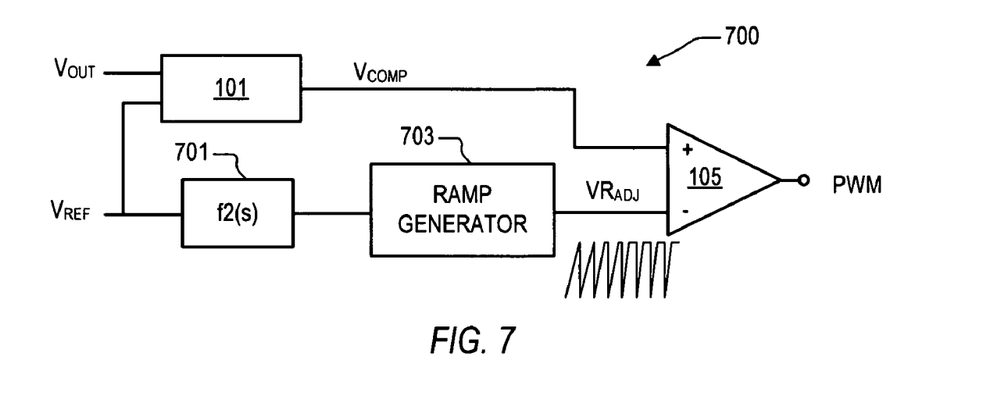
FIG. 7 is a schematic and block diagram of yet another PWM control circuit implemented according to another embodiment of the present invention which may be used to replace the PWM control circuit of FIG. 1.

FIG. 7 is a schematic and block diagram of yet another PWM control circuit 700 implemented according to another embodiment of the present invention which may be used to replace the PWM control circuit 102. The compensation network 101 is again included for providing the $V_{COMP}$ voltage to the non-inverting input of the comparator 105. In this case, $V_{REF}$ is provided to the input of another offset adjust circuit 701, which multiplies $V_{REF}$ by another function $f2(s)$. The offset adjust circuit 701 has an output coupled to an input of a ramp generator 703, which replaces the ramp generator 104. The ramp generator 703 provides an adjusted ramp signal $VR_{ADJ}$ at its output, which is provided to the inverting input of the comparator 105. In this case, the slew rate (or slope) of the $V_{RAMP}$ signal provided to the comparator 105 is adjusted according to the voltage level of $V_{REF}$ to minimize voltage variation of the voltage V_C1 across the capacitor C1.

Figure 8:
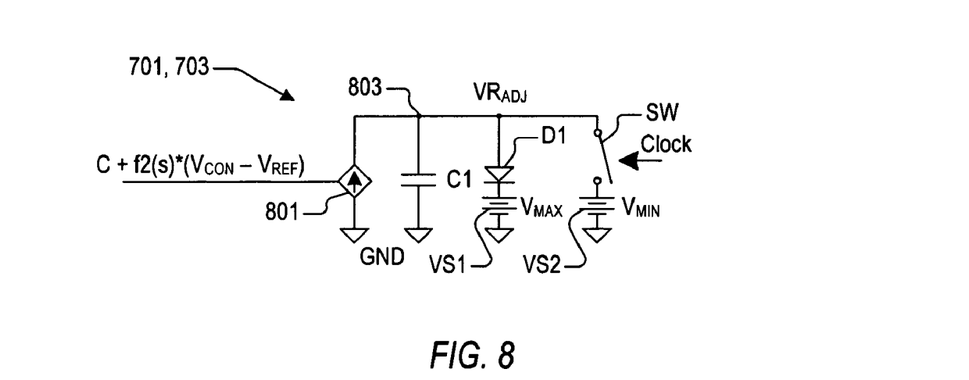
FIG. 8 is a schematic diagram of an exemplary embodiment of the function block and the ramp generator of the PWM control circuit of FIG. 7.

FIG. 8 is a schematic diagram of an exemplary embodiment of the offset adjust circuit 701 combined with the ramp generator 703 of the PWM control circuit 700. A voltage-controlled current source 801 is coupled between ground (GND) and a node 803 and sources a current to the node 803 to develop the $VR_{ADJ}$ signal. A capacitor C1 is coupled between node 803 and GND. Node 803 is coupled to the anode of a diode D1, having its cathode coupled to the positive terminal of a first voltage source VS1. The negative terminal of VS1 is coupled to GND. Node 803 is also coupled to one switched terminal of a single-pole, single-throw (SPST) switch SW, having its other switched terminal coupled to the positive terminal of another voltage source VS2. The negative terminal of VS1 is coupled to GND. The switch SW has a control terminal receiving a signal Clock and thus opens and closes with cycles of Clock.

The current source 801 has a control input receiving a voltage $C+f2(s)*(V_{CON}-V_{ref})$, where C and $V_{CON}$ are both constant voltage levels. The voltage source VS1 provides a voltage $V_{MAX}$ which is the maximum allowable voltage level of the $VR_{ADJ}$ signal. The voltage source VS2 provides a voltage $V_{MIN}$ which is the minimum allowable voltage level of the $VR_{ADJ}$ signal. As the voltage level of $V_{REF}$ is decreased, the current level output from the current source 801 is increased to increase the slew rate of $VR_{ADJ}$. In effect, the diode D1, the voltage sources VS1 and VS2 and the switch SW collectively form a switch circuit that enables the current source 801 to charge the capacitor C1 between minimum $V_{MIN}$ and maximum $V_{MAX}$ voltage levels at a rate determined by the Clock signal.

Figure 9:
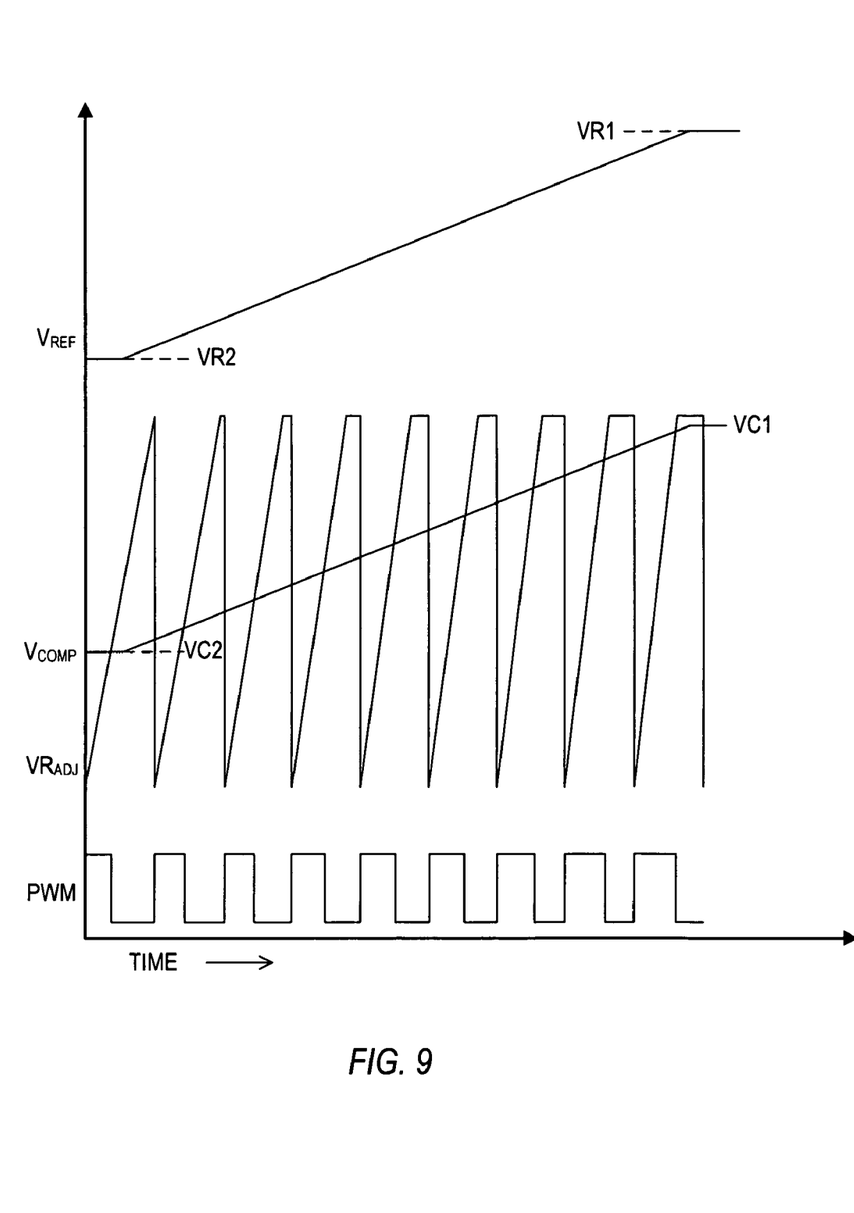
FIG. 9 is a timing diagram plotting the $V_{REF}$, $V_{COMP}$, $VR_{ADJ}$ and PWM signals versus TIME for the compensation offset adjustment circuit of FIG. 7.

FIG. 9 is a timing diagram plotting the $V_{REF}$, $V_{COMP}$, $VR_{ADJ}$ and PWM signals versus TIME for the compensation offset adjustment circuit 700. In this case, the $V_{REF}$ signal is shown ramping up from VR2 to VR1 (e.g., from 0.6V to 1.6V). The slew rate of the $VR_{ADJ}$ signal is adjusted accordingly (e.g., increased) by the ramp generator 703 in response to the offset adjust circuit 701 so that the $V_{COMP}$ signal correspondingly ramps up from VC2 to VC1. In this manner, the voltage V_C1 across the capacitor C1 remains substantially unchanged. The duty cycle of PWM is properly adjusted for the increase on the output voltage.

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for providing out the same purposes of the present invention without departing from the spirit and scope of the invention.

What is claimed is:

1. A pulse width modulation (PWM) control circuit for a voltage regulator, comprising:
    a compensation network having a first input sensing an output voltage, a second input receiving a reference voltage, and an output providing a compensation voltage;
    a ramp generator which provides a ramp voltage;
    an offset adjust circuit which adjusts a selected one of said ramp voltage and said compensation voltage based on said reference voltage; and
    a comparator circuit which compares said compensation voltage with said ramp voltage and which provides a PWM signal for controlling said output voltage.

2. The PWM control circuit of claim 1, wherein said offset adjust circuit generates an offset voltage based on said reference voltage and a gain G of the voltage regulator.

3. The PWM control circuit of claim 2, wherein said offset adjust circuit multiplies said reference voltage by 1−1/G to generate said offset voltage.

4. The PWM control circuit of claim 2, wherein said offset adjust circuit subtracts said offset voltage from said compensation voltage to provide an adjusted compensation voltage to said comparator circuit.

5. The PWM control circuit of claim 2, wherein said offset adjust circuit subtracts said offset voltage from said ramp voltage to provide an adjusted ramp voltage to said comparator circuit.

6. The PWM control circuit of claim 1, wherein:
    said compensation network comprises an error amplifier having first and second inputs and an output, wherein said first input receives said reference voltage;

wherein said compensation network further comprises a capacitor coupled between said second input and said output of said error amplifier; and wherein said offset adjust circuit minimizes voltage change across said capacitor in response to a voltage change of said reference voltage.

7. The PWM control circuit of claim 1, wherein said offset adjust circuit controls said ramp generator to adjust a slew rate of said ramp signal in response to a change of said reference voltage.

8. The PWM control circuit of claim 7, wherein said ramp generator and said offset adjust circuit comprise:
a voltage-controlled current source coupled between ground and a node developing said ramp voltage and providing a current as a function of a reference voltage to said node;
a capacitor coupled between ground and said node; and
a switch circuit coupled between ground and said node that enables said voltage-controlled current source to charge said capacitor between minimum and maximum voltage levels at a rate based on a clock signal.

9. A DC-DC voltage converter, comprising:
a gate drive circuit receiving a pulse width modulation (PWM) signal and providing first and second gate drive signals;
a first switch having current terminals coupled in series between an input voltage and a phase node and having a control terminal receiving said first gate drive signal;
a second switch having current terminals coupled in series between said phase node and ground and having a control terminal receiving said second gate drive signal;
an output inductor having a first end coupled to said phase node and a second end providing an output voltage; and
a PWM control circuit, comprising:
a compensation network having a first input sensing said output voltage, a second input receiving a reference voltage, and an output providing a compensation voltage;
a ramp generator which provides a ramp voltage;
an offset adjust circuit which adjusts a selected one of said ramp voltage and said compensation voltage based on said reference voltage; and
a comparator circuit which compares said compensation voltage with said ramp voltage and which provides said PWM signal.

10. The DC-DC voltage converter of claim 9, wherein said offset adjust circuit generates an offset voltage based on said reference voltage and a gain of the voltage regulator.

11. The DC-DC voltage converter of claim 10, wherein said offset adjust circuit subtracts said offset voltage from said compensation voltage to provide an adjusted compensation voltage to said comparator circuit.

12. The DC-DC voltage converter of claim 10, wherein said offset adjust circuit subtracts said offset voltage from said ramp voltage to provide an adjusted ramp voltage to said comparator circuit.

13. The DC-DC voltage converter of claim 9, wherein said offset adjust circuit controls said ramp generator to adjust a slew rate of said ramp signal in response to a change of said reference voltage.

14. A method of compensating for a transition of a reference voltage of a voltage regulator, comprising:
generating a compensation voltage based on the reference voltage and an output voltage of the voltage regulator;
providing a ramp voltage;
adjusting either one of the compensation voltage and the ramp voltage in response to a transition of the reference voltage; and
comparing the ramp voltage with the compensation voltage to generate a pulse width modulation (PWM) signal for controlling the output voltage.

15. The method of claim 14, wherein said adjusting either one of the compensation voltage and the ramp voltage comprises combining an offset voltage that is based on the reference voltage and a gain G of the voltage regulator.

16. The method of claim 15, wherein said combining an offset voltage comprises multiplying the reference voltage by $1-1/G$.

17. The method of claim 15, wherein said adjusting either one of the compensation voltage and the ramp voltage comprises subtracting the offset voltage from the compensation voltage to provide an adjusted compensation voltage and wherein said comparing comprises comparing the ramp voltage with the adjusted compensation voltage.

18. The method of claim 15, wherein said adjusting either one of the compensation voltage and the ramp voltage comprises subtracting the offset voltage from the ramp voltage to provide an adjusted ramp voltage and wherein said comparing comprises comparing the compensation voltage with the adjusted ramp voltage.

19. The method of claim 14, wherein said adjusting either one of the compensation voltage and the ramp voltage in response to a transition of the reference voltage comprises minimizing a difference between the compensation voltage and the reference voltage.

20. The method of claim 14, wherein said adjusting either one of the compensation voltage and the ramp voltage in response to a transition of the reference voltage comprises adjusting a slew rate of the ramp signal.

* * * * *

UNITED STATES PATENT AND TRADEMARK OFFICE
CERTIFICATE OF CORRECTION

PATENT NO.          : 7,489,121 B2                              Page 1 of 1
APPLICATION NO.  : 11/395909
DATED                   : February 10, 2009
INVENTOR(S)         : Weihong Qiu and Robert H. Isham It is certified that error appears in the above-identified patent and that said Letters Patent is hereby corrected as shown below:

At col. 4, line 20 the word "non-inverting" should read "inverting" instead.

Signed and Sealed this

Fifteenth Day of December, 2009

David J. Kappos
*Director of the United States Patent and Trademark Office*